March 14, 1967 R. M. WILSON 3,309,018

RESETTABLE COUNTER

Filed July 8, 1965 7 Sheets-Sheet 1

INVENTOR.
Ronald M. Wilson,
BY
Paul & Paul
ATTORNEYS.

March 14, 1967 R. M. WILSON 3,309,018

RESETTABLE COUNTER

Filed July 8, 1965 7 Sheets-Sheet 2

INVENTOR.
Ronald M. Wilson,
BY
Paul & Paul
ATTORNEYS.

March 14, 1967  R. M. WILSON  3,309,018
RESETTABLE COUNTER
Filed July 8, 1965  7 Sheets-Sheet 4

INVENTOR.
*Ronald M. Wilson,*
BY
*Paul & Paul*
ATTORNEYS.

March 14, 1967  R. M. WILSON  3,309,018
RESETTABLE COUNTER
Filed July 8, 1965  7 Sheets-Sheet 7

United States Patent Office 3,309,018
Patented Mar. 14, 1967

3,309,018
RESETTABLE COUNTER
Ronald M. Wilson, Ambler, Pa., assignor to William M.
Wilson's Sons, Inc., Lansdale, Pa., a corporation of
Pennsylvania
Filed July 8, 1965, Ser. No. 477,064
19 Claims. (Cl. 235—94)

This is a continuation-in-part of applicant's prior copending application Ser. No. 299,577 filed Aug. 2, 1963, which in turn is a continuation-in-part application of applicant's prior copending application Ser. No. 242,000 filed Dec. 3, 1962, which in turn is a continuation-in-part of a prior copending application Ser. No. 188,719 filed Apr. 19, 1962, all of which are now abandoned.

This invention relates to a resettable counter and to one form of the counter designed to function with a standard commercial gasoline pump or its equivalents. In greater detail, this invention relates to a resettable counter mechanism providing effective counting and resetting operations in a design which, when combined with control apparatus of a gasoline pump, prevents to the greatest degree possible the unrecorded pumping of gasoline by an operator.

It is well known in the art to provide in a counter a mechanism for returning the counting dials to the zero position or the count starting point after a recording or pumping operation is completed. This art teaches various mechanisms for disengaging the count input shaft or gear while the counting dials are rotated to zero. The mechanism of this invention discloses a novel drive clutch whereby the counting dials are reset even while the drive rotation by shaft or gear continues.

It is another advantage of this invention in that a single movement of the reset lever quickly causes all of the counting dials to return to zero, that a count is never left on a dial and that the dials are prevented from rotating beyond the zero position.

It is a further advantage of this invention in that an over-load clutch is provided whereby breakage of the gears and other mechanism due to jamming or continual engagement of the resetting lever is prevented.

It is still another advantage of this invention to effectively combine the counter mechanism having the above outlined advantages with the standard operating apparatus of an ordinary gasoline pump or the like whereby the pump and counter are operated at a single unit and are so constructed that the counting dials cannot be reset without the pump being shut off and that turning the pump on resets the counter.

These and other advantages of this invention will become more apparent from the written description contained herein and from the drawings attached hereto in which.

Figure 1:
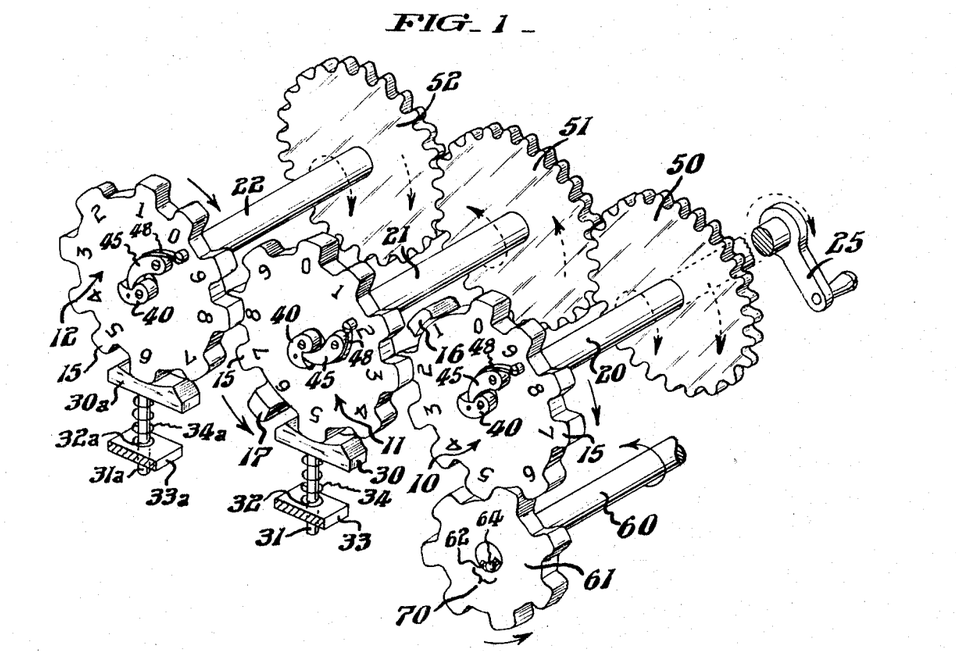
FIG. 1 is a perspective view showing one specific form of the resettable counter of this invention.
Figure 2:
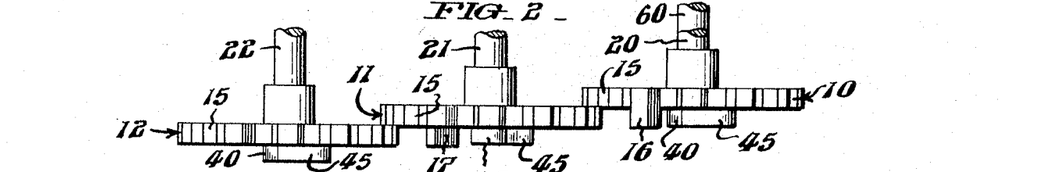
FIG. 2 is a plan view showing the position of the counting wheels in the form of the invention shown in FIG. 1.

One specific form of the resettable counter of this invention is shown in FIG. 1 of the drawings in which the three counting wheels or dials are identified by the numerals 10–12, and are shown as a series of laterally overlapping spur gears including a first driven gear 10. Each counting wheel has a plurality of spurs or teeth arranged equidistant around its circumference. As shown in FIG. 2, in addition to FIG. 1, the first two wheels 10, 11 are equipped with one enlarged tooth or spur 16, 17, respectively, which is thicker than the width of the remaining part of the wheel and which extends outwardly from the face of the two wheels. The first wheels 10, 11 have nine regular sized teeth or spurs in addition to the enlarged tooth 16, and wheel 12 has ten regular sized teeth. It should be understood that in place of the enlarged tooth 16, 17 an axially misaligned tooth may be positioned on the face of the two driving wheels 10, 11 in addition to the ten regular teeth, so that the misaligned tooth will engage the teeth of the adjacent wheel and cause said wheel to rotate. All three wheels 10–12 are mounted for free rotation on three individual shafts 20–22. The shafts 20–22 are spaced apart and substantially parallel to each other and the counting wheels 11-12 are arranged in substantially a tandem position slightly overlapping. As shown in FIG. 2, the normal size spurs 15 of each wheel 10-12 are not engaged or meshed with each other but the wheels are so positioned that the enlarged teeth 16, 17 of wheels 10, 11 will engage and mesh in the adjacent counting wheel by said spurs 16, 17 falling between two spurs of the adjacent wheels. It should be understood that, by means of the enlarged teeth 16, 17 on the first two counting wheels 10, 11, the second and last driven counting wheels 11, 12 are advanced only a portion of one revolution while the driving wheel advances through one entire revolution. From this construction, it follows that as the three counting wheels 10-12 are equipped with ten spurs each, including the enlarged spur, for one revolution of counting wheel 10, the second wheel 11 will advance one-tenth of a revolution. When counting wheel 11 advances through an entire revolution, it correspondingly causes wheel 12 to advance one-tenth of a revolution. Having ten spurs on each wheel provides for counting in a regular digital system with units of ten. It will be understood that by changing the number of teeth to eight, for instance, the count could be by pints, or to any convenient number of teeth for other systems of counting, such as dozens, etc. The counting wheels 10-12 are positioned within a counter or register (not shown) equipped with a viewing space located to show the top position on the face of each wheel. The wheels are marked with a series of numerals extending around their faces substantially as shown in FIG. 1. As the wheels rotate, the numbers positioned at the top positions on the face of the wheels as seen through the viewing window indicate the count. The number "0" is displayed behind each window when the wheels are returned to the zero position as described infra. In the position shown in FIG. 1, the counting dials or wheels indicate a count of 100.

Positioned below the wheels 11, 12 are two friction blocks 30 and 30a which act to restrain the free movement of wheels 11, 12. The blocks 30, 30a are mounted on two vertically aligned shafts 31 and 31a which move vertically slightly to adjust to the rotating wheels in two bores 32, 32a located in supporting member 33, 33a. Springs 34, 34a provide support to the friction blocks 30, 30a so that the blocks press with small pressure against the spur surfaces of the two wheels. The friction blocks or detents serve to locate a number exactly behind each window when a wheel is moved and also to prevent unplanned movement of a wheel due to vibration or the like.

Figure 3:
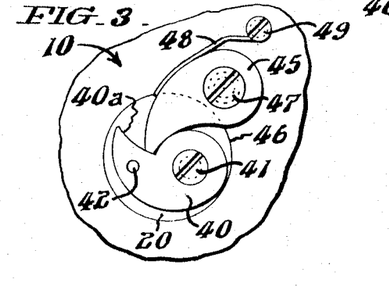
FIG. 3 is an enlarged, side elevational view showing the ratchet and pawl of one of the counting wheels shown in FIG. 1.

As shown in FIG. 3, attached to the end of shaft 20 adjacent the counting wheel 10 is a ratchet 40, shaped as shown. Attached to wheel 10 is a pawl 45 shaped as shown. The ratchet and pawl mechanisms for the counting wheels 11, 12 are of the same construction as described in reference to counting wheel 10.

It will be noted that each wheel is free to rotate in the count increase direction, that is, the direction which will serve to display a higher number behind the viewing space or window (not shown) at each increment of rotation.

The position of the two components is the same in wheels 10 and 12, but in wheel 11 the components are in reverse position as that wheel rotates counterclockwise when counting and being reset to the zero position. The ratchet attached to shaft 21 has a direction which is substantially counterclockwise. Similarly, the pawl connected to wheel 11 has a direction which is substantially clockwise, thereby allowing the pawl to engage the ratchet when the resetting shaft 21 is rotated in a counterclockwise direction. The pawl and ratchet attached to wheels 10 and 12 are arranged in the converse position, as shown, thereby allowing the wheels 10, 12 to be rotated in the clockwise direction when shafts 20, 22 respectively, rotate in the same direction. The ratchet 40 is held to the end of shaft 20 by means of a screw 41 which grips the ratchet and extends into the shaft 20. The ratchet further is prevented from rotating by a shaft 42 which extends through the ratchet 40 and into shaft 20. A complementary-shaped pawl 45 is attached to counting wheel 10 adjacent the bore 46 of the wheel. Pawl 45 is attached to the face of counting wheel 10 by a screw 47 which grips the pawl and extends into the wheel, but allows the pawl 45 to describe an arc around the screw 47. Against one side of pawl 45 is positioned a spring 48 held to the counting wheel by a screw 49, whereby the pawl 45 is directed under spring tension against the ratchet 40. As viewed in FIG. 3, when the wheel 10 rotates clockwise, the pawl 45 will endlessly follow along the outside surface of ratchet 40 slipping entirely around the ratchet without interferring with the rotation of wheel 10 in this direction. When shaft 20 is rotated in the clockwise direction as viewed from the ratchet 40, the ratchet will pick up the pawl 45 by means of the edge 40a and will cause the wheel 10 to rotate clockwise with the shaft 20.

As shown in FIG. 1 fixedly mounted on the shafts 20-22 are three spur gears 50-52 arranged so that they engage or mesh with each other and cause the three shafts 20-22 to rotate in unison. As indicated by the broken arrows in FIG. 1, the shafts 20 and 22 rotate in the same direction, while shaft 21 rotates in the opposite or counterclockwise direction. A handle or crank 25 is attached to shaft 20 for rotating said shaft and for resetting the dials to the zero position by means of gears 50-52, the shafts 20-22, and the pawl and ratchet mechanisms on each wheel. Said handle rotates in the direction shown by the broken arrow.

Figure 4:
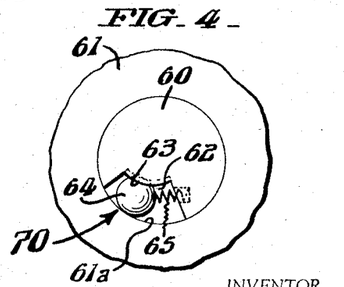
FIG. 4 is an enlarged, side elevational view of the unidirectional clutch of this invention.

A count input gear 61, shown toward the bottom of FIG. 1, is positioned to engage the spurs 15 of the first-driven counting wheel 10. The count input shaft 60, upon which input gear 61 rotates, is directly connected to the source of motion that is to be counted and may be connected by means of a flexible cable or the like. The input shaft 60 and the input spur gear 61 are connected by means of a unidirectional clutch 70, shown in greater detail in FIG. 4. The input shaft 60 is equipped with an arcuate tapered groove 62 having a lip 63 in which a ball bearing 64 or roller bearing is positioned. A spring 65 urges the bearing 64 to the left or in a clockwise direction as shown in FIG. 4. The arcuate tapered groove 62 in the end of shaft 60 progressively diminishes in size as it extends from the right to the left as shown in FIG. 4. In operation, when the input shaft 60 is counting and rotating counterclockwise, the bearing 64 jams into the smaller end of the tapered groove 62 and presses against the inner surface 61a of the bore of the input gear 61 thus causing the gear to jam around the shaft 60 and rotate in the same or counting direction. By means of this action a counting movement is imparted to counting wheel 10 and then progressively to wheels 11 and 12. When the counting wheels are to be reset and counting wheel 10 is rotated in the clockwise direction by means of handle 25 and shaft 20, as explained supra, input gear 61 is rotated counterclockwise ahead of shaft 60 causing the bearing 64 to move into the larger end of the tapered groove 62 and thus allowing gear 61 to rotate freely around shaft 60 in the resetting direction.

In operation, the preferred form of the resettable counter of this invention functions substantially as follows:

When the counter is counting a movement, input shaft 60 rotates in a counterclockwise direction, as shown by the unbroken arrow, imparting a like movement to gear 61 by means of the unidirectional clutch 70 as explained supra. As input gear 61 meshes with the first-driven counting wheel 10, said wheel rotates in a clockwise direction. As the enlarged spur 16 of wheel 10 progresses around its circular course it engages the spurs of wheel 11, thus causing wheel 11 to rotate a portion of one revolution in a counterclockwise direction. Similarly, counting wheel 11, by means of enlarged spur 17, advances counting wheel 12 in a clockwise direction. When wheel 10 is rotated by means of its spurs 15, pawl 45 slips around ratchet 40 so that wheel 10 rotates freely around shaft 20. Similarly, the remaining wheels rotate freely about their shafts. At this time the counter is recording the count by means of the numbers on the face of the wheels as viewed through register window (not shown).

When the count is completed, or it is otherwise desired to reset the counter to the beginning or zero position, handle 25 is rotated in the direction shown by the broken arrow, causing shaft 20 to rotate and also shafts 21 and 22 to rotate by means of the meshing spur gears 50–52. As shaft 20 rotates in the direction indicated by the broken arrow, ratchet 40 engages pawl 45 causing the counting wheel 10 to rotate with shaft 20 in the resetting direction. Similarly, the pawls and ratchets of the other counting wheels are engaged causing these wheels to rotate. When wheel 10 causes input gear 61 to rotate faster than the input shaft 60 is rotating, the unidirectional clutch 70 functions to allow gear 61 to rotate freely around shaft 60 in the direction of the unbroken arrow. The pawls and ratchets of each wheel are positioned on the shafts and wheels so that the wheels are picked up one after the other as the shafts rotate in the resetting direction. The wheels are synchronized so that when one wheel reaches the zero position all of the wheels are at the zero position.

Figure 5:
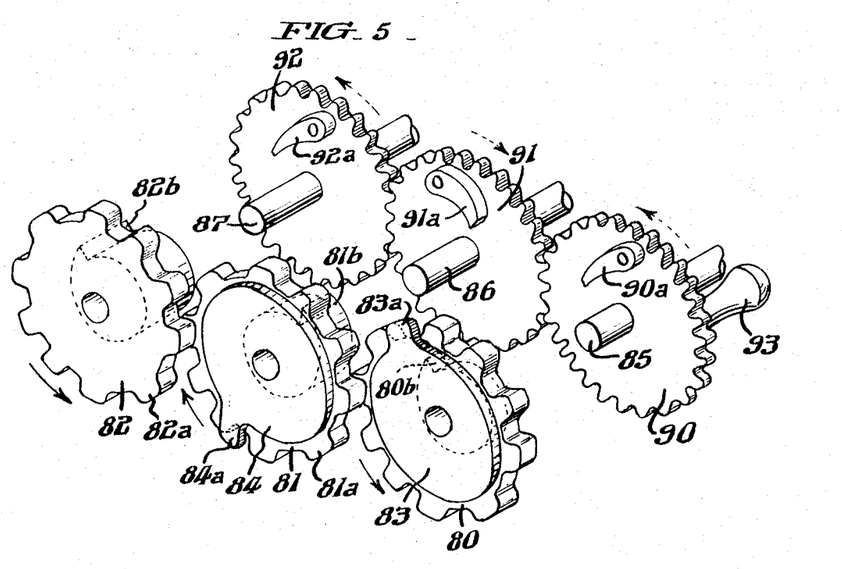
FIG. 5 is an exploded perspective view showing a modification of the mechanism of this invention.
Figure 6:
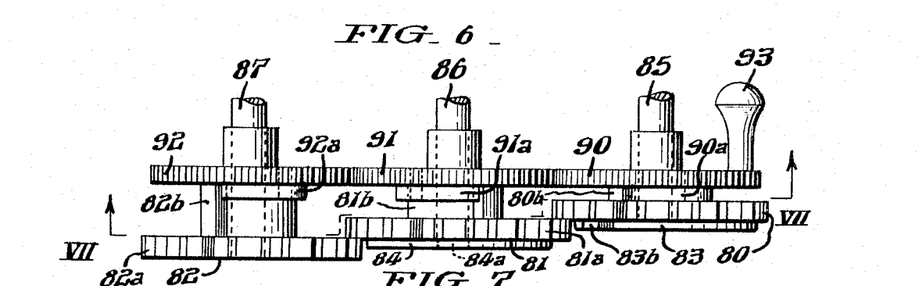
FIG. 6 is a top view of the modification shown in FIG. 5.
Figure 7:
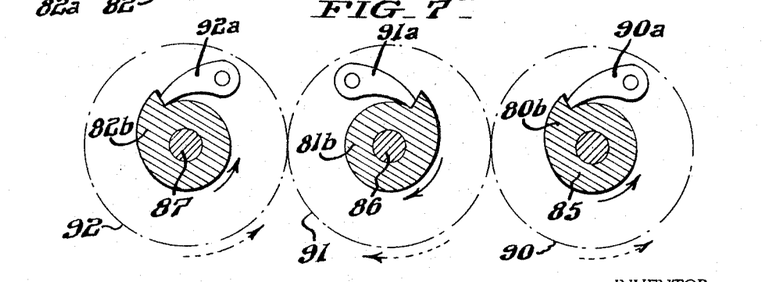
FIG. 7 is a side elevational view of part of the mechanism shown in FIGS. 5 and 6 and taken along the lines and arrows VII–VII of FIG. 6.

A modification of the resettable counter of my invention is shown in FIGS. 5 through 7. Three counting wheels 80, 81 and 82 are mounted for free rotation on three shafts 85, 86 and 87, respectively. Attached to the front face of both of the first two counting wheels 80 and 81 are two gears 83 and 84, which rotate with the counting wheels when the wheels are driven by the count input gear (not shown). Gear 83 and gear 84 each have one extending tooth 83a, 84a so positioned that these teeth engage the regular teeth 81a, 82a positioned uniformly around the circumference of the last two counting wheels 81, 82. The gears 83, 84 are simply a different form of the extending spur 16, 17 shown in FIG. 1.

Positioned adjacent the three counting wheels 80–82 are three resetting spur gears 90–92 which are mounted on shafts 85–87 for free rotation. As shown in FIGS. 5 and 6, the three resetting gears 90–92 mesh with each other so that the rotation of one gear rotates the other two. A handle 93 is attached to resetting gear 90. Each resetting gear is provided with a pawl 90a, 91a and 92a which is mounted on the face of the resetting gear so that the pawls will contact and engage three ratchets 80b, 81b and 82b attached to the reverse face of the counting wheels 80–82, respectively. As shown in FIG. 6, the ratchets 82b and 81b are slightly larger than ratchet 80b so as to accommodate the laterally displaced counting wheels 80–82 and to provide means for contacting the three pawls attached to the tandem resetting gears.

This modification of my invention operates substantially as follows. When the input gear (not shown), similar in construction and operation to that shown in FIG. 1, rotates the first counting wheel 80 in the direction indicated by the unbroken arrow, the outstanding spur 83a engages the teeth 81a arranged around the circumference of the second counting wheel 81 and causes that wheel to rotate. In turn, the outstanding spur 84a of gear 84, rotating with wheel 81, engages the teeth 82a of counting wheel 82, thus causing that counting wheel to rotate through a portion of one revolution while counting wheel 81 rotates through one entire revolution. As described in connection with the mechanism of FIG. 1, the wheels 80–82 have a series of numerals arranged around their faces so as to indicate the number of turns made by the input gear. As the counting wheels 80–82 are counting, the ratchets 80b, 81b and 82b slip beneath the contacting pawls 90a, 91a and 92a without said pawls and ratchets engaging. When it is desired to reset the counting dials to the zero position, the handle 93 is rotated in a direction indicated by the broken arrow. As resetting gear 90 is rotated in this direction, the resetting gear 91 rotates in the opposite direction. Correspondingly, resetting gear 92 rotates in the direction indicated by its broken arrow. As the resetting gears are aligned as shown in FIGS. 6 and 7 so that the pawls 90a, 91a and 92a are in contact with ratchets 80b, 81b and 82b, respectively, the pawls engage the ratchets so as to turn the ratchets and the counting wheels in the direction of the broken arrows when the resetting handle 93 is rotated in the resetting direction.

It should be understood that in the modification of my invention shown in FIGS. 5 through 7, the counting wheels are returned to the zero position without disengaging the wheels from the count input gear (not shown) in a manner similar to that shown in the mechanism of FIG. 1. However, in the FIGS. 5–7 modifications, the shafts do not rotate but instead the resetting motion is delivered from each resetting gear directly to each counting wheel by the ratchet and pawl construction shown. In addition, in FIG. 5 an offset driving gear is shown in place of the enlarged spur 16 of FIG. 1. It should be understood that the offset gear of FIG. 5 is just one of a number of different modifications that may be used for this purpose in this resettable counter.

It is seen from the above disclosure that the resettable counter of this invention provides a means for returning the counting wheels to the zero position without disengaging or otherwise disturbing the position or action of the counting input mechanism. Also, that even as the resetting operation is accomplished simply by rotating the resetting shafts and the counting wheels, there is provided fully automatic means for allowing the counting wheels to rotate while still engaged to the counting mechanism.

It should be understood that any one skilled in the art could modify the counter of this invention to provide for counting wheels with less than ten spurs each. For example, there could be eight spurs around the circumference of each wheel so as to register pints and gallons. In addition, more than three counting wheels may be used so as to count larger numbers and, accordingly, fewer counting wheels may also be employed when it is advantageous to do so. It should be further understood that a unidirectional clutch, other than that shown, could be utilized to best advantage without departing from the spirit of this invention.

Figure 8:
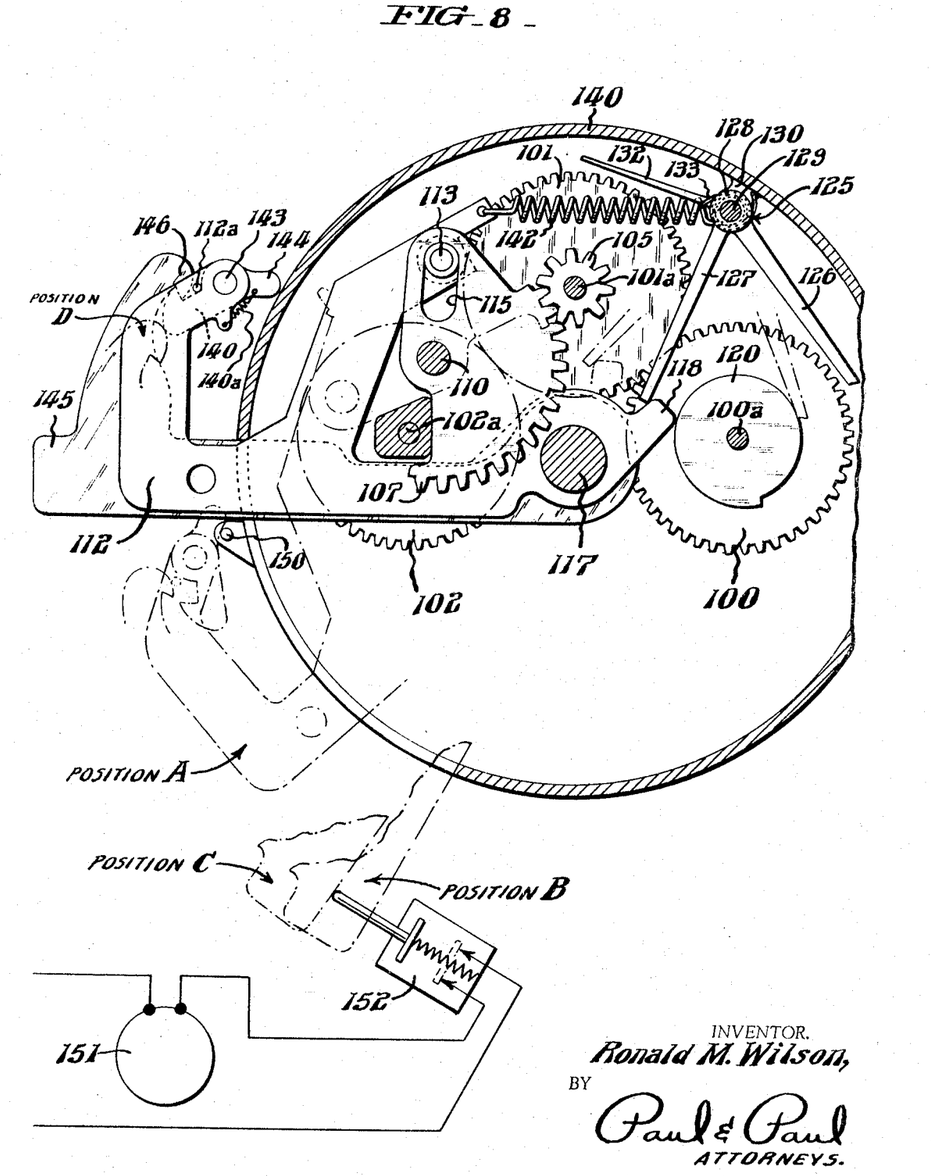
FIG. 8 is a plan view partly in section showing one form of the pump resettable counter mechanism of this invention.

A modification of the resettable counter of my invention shown in FIGS. 1 and 5 is the apparatus shown in FIG. 8 in which the resettable counter mechanism is combined with apparatus designed to operate in an ordinary gasoline pump or the like. It should be clear that the counter of FIG. 8 can be used to record the discharge of any type of fluid in any type of rotary pump and even simply to count rotary movement, but one particular use, that is, with an ordinary gasoline dispensing pump will be described hereinbelow.

In the plan sectional view shown in FIG. 8 the three resetting gears 100, 101 and 102 are mounted in generally a crescent shape with the center resetting gear 101 engaged with and driving the other two gears. All three resetting gears are mounted on their respective shafts 100a–102a upon which are also mounted the three counting wheels (not shown) as disclosed in FIGS. 1 through 5, FIGS. 15 through 25, or FIGS. 26 through 30. As described supra, the counting wheels may be reset by motion transmitted through the pawl and ratchet arrangements as shown in the various forms of this invention or by equivalent means.

Attached to the center resetting gear 101 is a smaller diameter spur gear 105, which engages and is driven by a quadrant spur gear 107. Quadrant gear 107 revolves around shaft 110 and is manually rotated by means of a resetting lever 112 and a projection 113 positioned in an elongated groove 115 of the quadrant 107. Resetting lever 112 revolves around a center shaft 117 and is equipped with a lug 118.

The resetting gear 100 is equipped with a ratchet 120 against which an anti-overthrow mechanism 125 operates. The anti-overthrow mechanism 125 comprises two elongated bars 126, 127 mounted on a common base 128 which revolves around a shaft 129. The shaft is mounted in a stationary projection 130. The anti-overthrow mechanism 125 further is equipped with an arm 132 attached by a spring 133 to the base 128, so that when the two bars 126, 127 rotate in the clockwise direction, as a result of bar 127 being pushed by lug 118, the arm 132 strikes the edge of the counter wall 104 and compresses spring 133. Bar 126 then moves into position against ratchet 120, thus preventing further rotation of resetting wheel 100 in the resetting or counterclockwise direction. Upon rotation of the resetting lever 112 in the clockwise direction to the normal position as shown in FIG. 8, spring-biased arm 132 causes bar 126 to move away from the ratchet 120 into its initial position. The ratchet 120 is so positioned in relation to resetting gear 100 and the counting wheel (not shown) mounted on shaft 100a that, when the ratchet engages bar 126 preventing further movement of the resetting gear, the counting wheel is then in the zero position. The anti-overthrow mechanism 125 can also be disengaged by a companion lug (not shown) to lug 118 which, by urging bar 127 counterclockwise, moves base 128 and thus bar 126 to the "clear" position.

It should be clear from FIG. 8 that the resetting gears 100, 101 and 102 are all returned to their respective initial positions by quadrant gear 107 so that each reset gear always starts from its same initial position. Also movement of bar 126 into an intervening position against ratchet 120 is delayed until the reset gears have rotated at least one-quarter revolution, thus ensuring that all of the dials will be returned to the zero position under all conditions. If the counting dial controlled by reset gear 100 were positioned to be picked up immediately upon rotation of the reset gear, bar 126 would not stop movement of either the reset gear or dial, and both would revolve one and one-quarter revolutions before being stopped at the zero position. In the arrangement shown in FIG. 8, therefore, the engaging edge of the ratchet 120 must be located slightly less than one-quarter revolution from the interfering position of the bar 126 when said ratchet starts. This is exactly what is shown.

As shown in FIG. 8, the resetting lever 112 is equipped with a tripper arm 140 pivotally mounted on pivot 143 and held against a stop 112a by a spring 140a extending to portion 144 of the tripper arm 140. Positioned beneath lever 112 is the gasoline motor pump switch lever 145 which has a shaped latch arm 146 so as to engage the tripper arm 140. An upstanding stud 150 is positioned adjacent the counter wall 104 as shown, so that when the lever 112 is moved with lever 145 in the counterclockwise direction, the stud 150 will strike portion 144 of the tripper arm 140 and thereby disengage lever 112. Resetting lever 112 is equipped with a spring 142 so as to return the lever to the position of FIG. 8 when the lever disengages from lever 145.

In operation, this modification of my invention functions substantially as follows. When the dispensing pump is not in use and the pump motor 151 turned off, the pump switch lever 145 and resetting lever 112 are in the position shown in solid lines in FIG. 8. As such the counting wheels reflect the amount of fluid which was previously pumped by the pump motor. It should be understood that the pump switch lever 145 is of such size and extends beyond the outside structure of the pumping unit so that this lever alone and not lever 112 is manipulated by the operator to start and stop the pump motor. When more gasoline or fluid is to be discharged, switch lever 145 is depressed or moved in the counterclockwise direction moving lever 112 with it against spring 142. As resetting lever 112 is rotated, quadrant 107 rotates the three resetting gears 100–102 to reset the counting wheels to the zero position. When both levers reach position A as indicated in FIG. 8, stud 150 causes tripper arm 140 to disengage allowing spring 142 to return lever 112 to the original position. After disengaging from lever 112, the pump lever 145 continues in the same counterclockwise direction to position B. At this point, switch 152 is activated to allow electric current to flow to the pump motor 151 providing for the discharge of fluid. After the desired quantity of fluid has been pumped, lever 145 is moved in a clockwise direction and, at position C, causes switch 152 to break the circuit to the pump motor. Upon further movement in the clockwise direction, the latch arm 146 of lever 145 moves the trip arm 140 as at position D so that levers 145 and 112 become engaged.

By means of the mechanism described above, the pump motor must be shut off before the resetting mechanism will clear the counting wheels and the resetting operation is complete before the pump motor is energized. This prevents an operator from resetting the counting wheels while pumping fluid or while the pump motor is on.

Certain further modifications can be made in this mechanism without departing from the essential elements taught herein. In place of the two levers 145, 112 shown in FIG. 8, a single resetting lever can be constructed to first reset the counting wheels and then start the pump motor. Further, a simple latch can be provided to engage the single lever after the pump has been shut off and prevent the pump being turned on without first resetting the counting wheels.

Figures 9, 14:
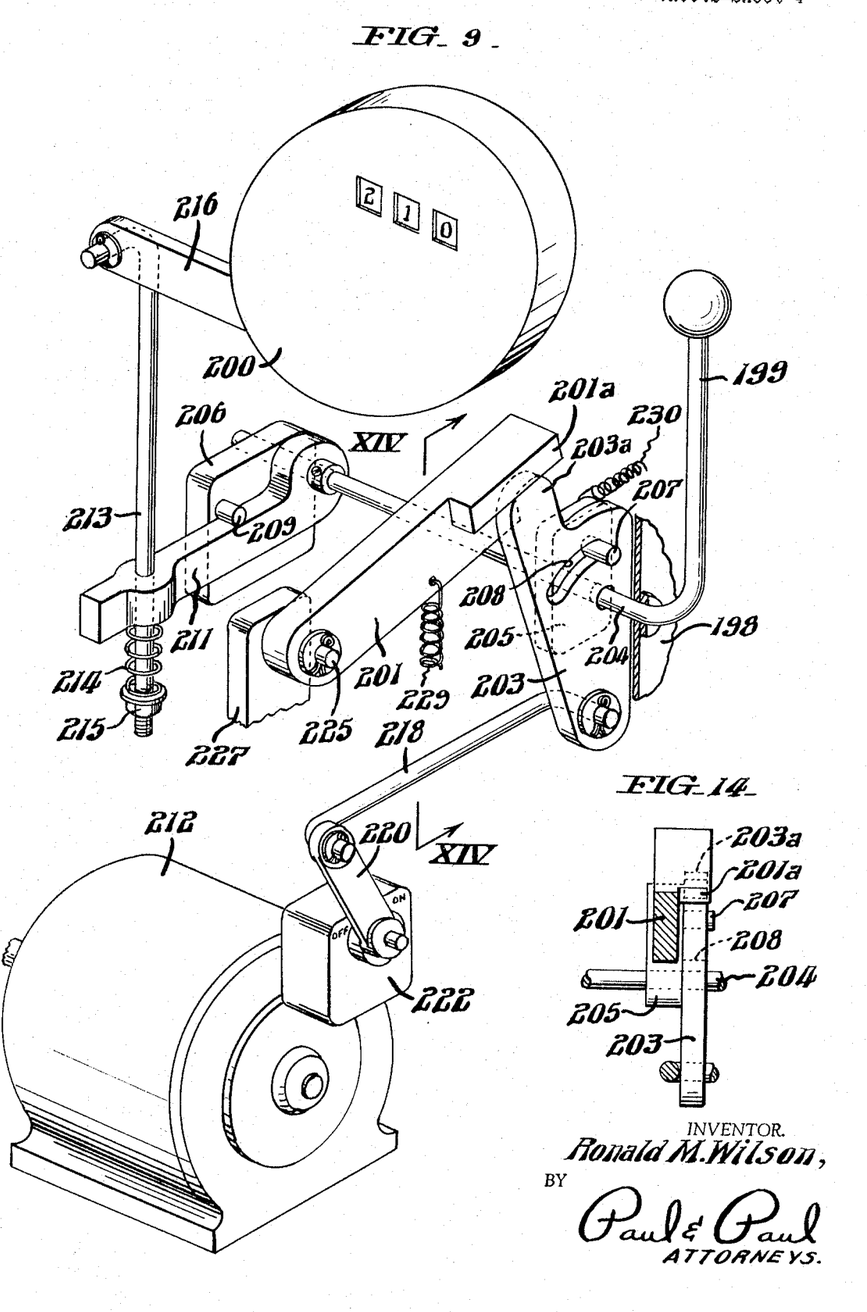
FIG. 9 is a perspective view of a modified form of counter resetting and pump actuating mechanism of this invention.
FIG. 14 is an end elevational view, partly in section, taken along the lines and arrows XIV—XIV of FIG. 9.

The resettable counter of this invention can further be assembled with a pump actuating mechanism in the form shown in FIG. 9. In that figure, a control handle 199 which is positioned on the outside of a typical pump (indicated by structure 198) forms a continuation of the control shaft 204. The control shaft and the apparatus mounted thereon act upon rotation to reset the resettable counter 200 and to operate the pump motor 212. The resettable counter is a form of the apparatus shown in FIGS. 1–7 and described supra. The pump motor 212 is an ordinary electric motor connected to a pump for dispensing gasoline or the like.

Mounted on the control shaft 204 so as to rotate with it are two blocks 205, 206. Block 205 is equipped with a stud 207 moving within an arcuate slot 208 positioned within switch lever 203. Block 206 has a stud 209 which causes resetting lever 211 to move in a counterclockwise direction when control shaft 204 is rotated in the same direction. Resetting lever 211 has a vertical bar 213 positioned therethrough and held in place by a spring 214 and nut 215. Bar 213 is attached at its upper end to a lever 216 which causes the resettable counter to reset to a zero count when lever 216 is moved in the downward direction. Lever 216 of FIG. 9 corresponds to lever 112 of FIG. 8.

Switch lever 203 is pivotally attached to arm 218 which is pivotally mounted on bar 220. Bar 220 is attached to the switch mechanism 222 of the pump 212 so that when bar 220 is in the position shown in FIG. 9, the motor is switched off. Similarly, when switch lever 203 moves counterclockwise, arm 218 and bar 220 move to the right in FIG. 9 and switch the motor on so as to pump gasoline and the like.

A latch 201 is mounted for pivotal movement on a shaft 225 which, in turn, is mounted in a supporting member 227. The latch has an overhanging portion 201a which rides along the top of cam 203a of switch lever 203. A spring 229 pulls the latch 201 in the downward direction at all times. Spring 230 is attached to block 205 tending to direct that block, the control shaft 204 and block 206 in a clockwise direction as shown in FIG. 9. Both springs 229, 230 are attached to suitable supporting members (not shown).

The pump actuating mechanism and, in particular, the positioning the latch 201 in relation to block 205 and the switch lever 203 is shown in greater detail in FIG. 14.

Figure 10:
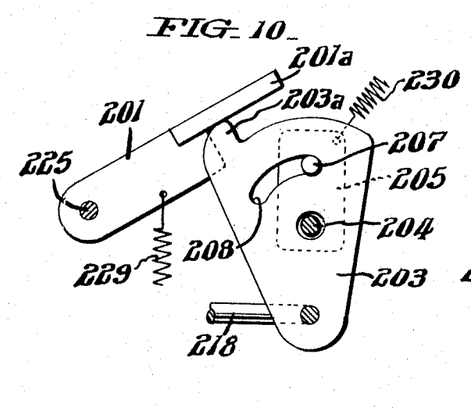
FIGS. 10–13 are side elevational views of part of the mechanism shown in FIG. 9.
Figure 11:
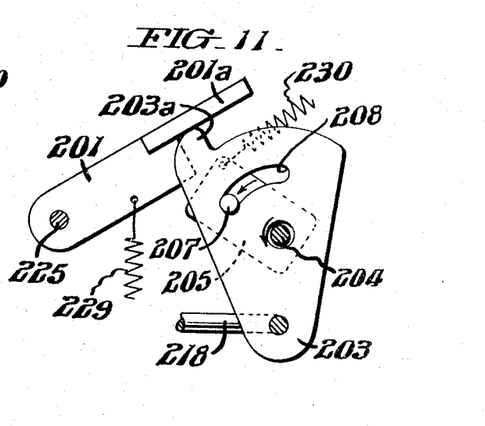
Figure 12:
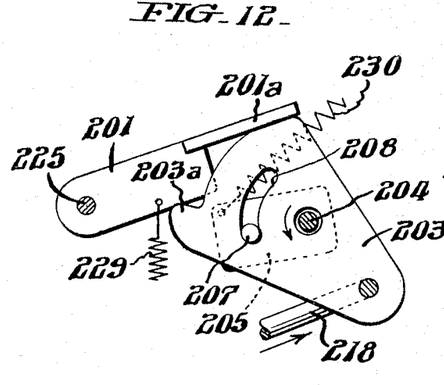

FIGS. 10-13 illustrate the sequence of movement of the pump actuating mechanism. In FIG. 10, condition I, the pump motor is off and the counter (not shown) records the amount of fluid pumped in the last delivery. The position of the apparatus shown in FIG. 10 is the same as that shown in FIG. 9 with the control handle 199 in the vertical position.

In condition II (FIG. 11), the reset condition, control handle 199 is rotated by the operator approximately 45 degrees from the vertical position. As such, block 205, rotating with control shaft 204, moves so as to place stud 207 at one end of groove 208 without causing switch lever 203 to turn. At the distal end of shaft 204, block 206 and stud 209 (not shown in FIG. 11) have rotated so as to move resetting lever 211 downward, this motion being transferred to lever 216. As described in connection with FIG. 8, rotation of lever 216 causes the resetting wheels of the counter 200 to rotate and return the counting dials to the zero position.

In condition III (FIG. 12), the start condition, the operator further turns the handle past the 90-degree position causing shaft 204 to rotate. Block 205 and stud 207 rotate causing switch lever 203 to rotate in a counterclockwise direction. The action causes arm 218 to switch on the starting mechanism 222. At this point, cam 203a moves from beneath the overhang 201a of latch 201 allowing the latch to spring downward. Latch 201 is now in interference position with block 205.

Figure 13:
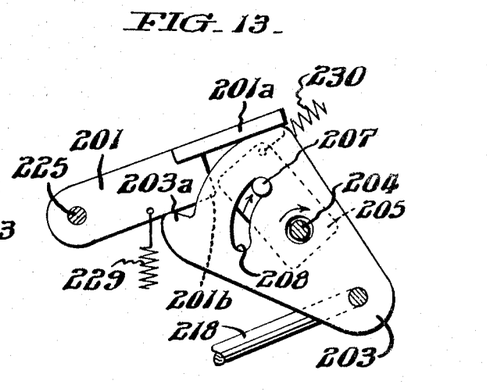

In condition IV, the run condition, as shown in FIG. 13, control shaft 204 and the attached block 205 are rotated in a clockwise direction under the tension of spring 230 and handle 199. The operator can manually turn the handle clockwise or he can allow spring tension to do the same. The handle returns to approximately the 45-degree position. Switch lever 203 remains in the position shown in FIG. 12 even though block 205 rotates clockwise and the motor remains on. Block 205, having slightly raised latch 201 by striking the latch at edge 201b and rotated into the position shown in FIG. 13, cannot then be rotated again in the counterclockwise direction. Rotation in this direction would cause the block to strike edge 201b of the latch which is tensioned downward by spring 229. The only way control shaft 204 and its attached blocks can be again rotated counterclockwise so as to reset the counter is, first, to rotate the shaft 204 further in a clockwise direction so that cam 203a strikes latch 201 and raises it to the position shown in FIGS. 10 and 11. Because of this construction, once control shaft 204 has been rotated to the start and run condition, the resetting mechanism cannot be used to reset the counter until the control shaft is returned to condition I with the motor turned off.

The sequence of operation of the apparatus is as follows. Control handle 199 positioned for easy access by the attendant is rotated first through approximately 45 degrees causing block 206 and lever 211 to reset the counter to the zero condition. Upon further rotation, the motor is turned on by block 205 engaging and rotating lever 203. The lever 199 is then returned by spring action to the 45-degree position where it remains during regular pumping of gasoline or the like. Latch 201 has meanwhile fallen into position so that block 205 cannot again be rotated counterclockwise to reset the counter without returning the handle to the original position and shutting the pump off. When delivery of gasoline is completed, the control handle is returned to the vertical position switching the motor off. The sequence is then complete with the counting dials recording the amount of fluid pumped.

By use of the latch mechanism described in connection with FIG. 8 and the control shaft and blocks of FIG. 9 above, the counter would be reset automatically every time the pump motor was started. In addition, the motor would have to be shut off before the counter could be reset. These modifications which tie the operation of the pump switch control to the resetting apparatus are designed to prevent, as far as possible, the unauthorized and unrecorded pumping of gasoline or the like by the operator.

A second modification of the resettable counter of this invention is shown in FIGS. 15 through 25 of the drawings. These figures illustrate the preferred form of a single counter wheel assembly wherein a counting dial, a resetting gear, an overload clutch, a drive clutch, and an anti-overthrow resetting apparatus are combined into a single wheel assembly. It should be understood that the unitary wheel assembly of FIGS. 15-25 is intended to be combined with two generally similar assemblies and with the resetting mechanism and pump assembly shown in FIGS. 8 through 14, thereby providing a full operating mechanism having superior features over the counters of the prior art.

Figures 15, 16, 17, 18, 19, 20, 21, 22, 23, 24, 25:
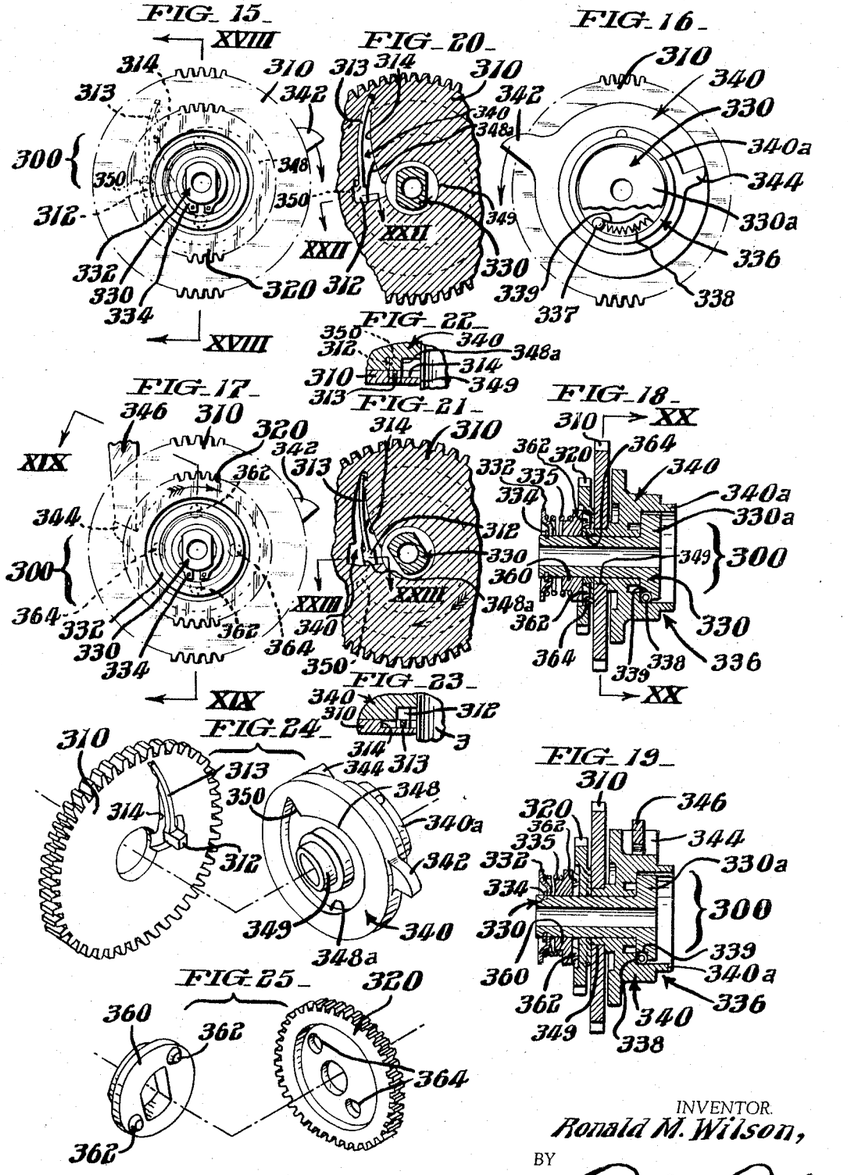
FIG. 15 is a side elevational view from the rear of a modification of a counter wheel assembly in which the counting dial, resetting gear, input clutch and overload clutch are combined in a single unit.
FIG. 16 is a side elevational view of the wheel assembly of FIG. 15 as seen from the front.
FIG. 17 is a side elevational view of the assembly as shown in FIG. 15 with the anti-overthrow mechanism shown in broken lines.
FIG. 18 is a sectional view of the counter wheel assembly taken along the lines and arrows XVIII—XVIII of FIG. 15.
FIG. 19 is a sectional view of the wheel assembly shown in FIG. 17 taken along the lines and arrows XIX—XIX.
FIG. 20 is a partial view in section of the resetting gear taken along the lines and arrows XX—XX of FIG. 18.
FIG. 21 is a view similar to FIG. 20 showing the pawl disengaged.
FIG. 22 is a partial, sectional view taken along the lines and arrows XXII—XXII of FIG. 20.
FIG. 23 is a top sectional view taken along the lines and arrows XXIII—XXIII of FIG. 21.
FIG. 24 is a perspective view showing the shaft alignment of a resetting gear and a counting dial.
FIG. 25 is a perspective view of the overload clutch showing the alignment of the two members.

The counter wheel assembly shown in FIG. 15 et seq. is the primary or units wheel assembly in a multi-wheel counter. The remaining wheel assemblies (not shown in FIGS. 15-25 but indicated in FIG. 8) consist preferably of a counting dial and a reset gear mounted on a hub, the additional wheel assemblies or higher order dials being activated by the primary assembly or lower order dial so as to record a multi-digital "count." The "count" itself can be displayed directly from the counting dials or from other wheels controlled by the counting dials. It has been found practical to have the antioverthrow reset apparatus, the overload clutch and the input clutch, as disclosed below, all mounted and arranged in the primary wheel assembly; however, obvious variations on this arrangement are possible.

Referring now to FIG. 15 of the drawings, a preferred form of counter wheel assembly of this invention is shown from the back and generally designated by the numeral 300. The wheel assembly, as shown in that figure, includes a large diameter resetting gear 310, shown partly with broken lines, and a smaller input drive gear 320 located in front of gear 310 in that view. The input count is delivered from a cable or a shaft (not shown) through a gear (not shown) directly to the drive gear 320. Both the resetting gear 310 and the drive gear 320 are mounted on a ring portion 349 of a dial 340 (FIG. 19) which, in turn, is mounted on a hub 330. The hub 330 has an axial base for mounting on a stationary shaft or stud (not shown). A washer 332, a spiral spring 335 (FIG. 19) and a spring clamp 334 are mounted on the distal end of hub 330 for the purpose described below. Shown in broken lines in FIG. 15 is a resetting pawl 312 which has a spring arm 313 and operates flexibly within a groove 314 located in the reset gear 310, as shown in greater detail in FIGS. 20 and 21.

The wheel assembly is shown from the front in FIG. 16. Mounted on the tubular portion of the hub 330 behind a hub flange 330a (FIGS. 18 and 19) is a counting wheel or dial 340 having a peripheral counting pawl 342 which is located to engage and cause a second counting wheel (not shown) to rotate or count. An anti-overthrow stop 344 is also mounted on dial 340. As shown best in FIGS. 18 and 19, the dial 340 has a front annular flange 340a which, together with the enlarged front hub flange 330a of the hub, forms the sides of a unidirectional drive or input clutch 336. The clutch 336 (FIG. 16) includes, in addition, a ball or roller bearing 337 and a spring 338 mounted in a tapered slot or groove 339 formed in hub flange 330a which has a narrow end positioned to the left or in the clockwise direction as shown in FIG. 16. The bearing 337 is driven to the small end of groove 339 as the hub 330 rotates counterclockwise, causing the bearing to frictionally engage the surface of the flange 340a of the counting dial 340 thereby rotating the counting dial with the hub in the counterclockwise or counting direction. This movement causes the counting pawl 342 to rotate in the direction of the arrow and thereby engaging and advancing the gear teeth of the adjacent counting dial (not shown).

The resetting anti-overthrow stop 344 functions substantially as indicated in FIG. 17 wherein an anti-overthrow pawl or bar 346 advances into an interfering position and engages the stop 344 on dial 340. This prevents further resetting rotation of the counting dial 340 beyond the zero position. The bar 346 of the apparatus of FIGS. 15–25 is similar to bar 126 of FIG. 8 and may be controlled by the mechanism of FIG. 8. It should be noted that bar 346 (similar to bar 126) is not immediately advanced to the interfering position when resetting begins because it is advantageous to allow the reset gear and, in some instances, the dial to rotate approximately one and one-quarter revolutions on each reset. The advantages are further described below.

One form of overload clutch embodied in the preferred wheel assembly is shown in FIGS. 18, 19 and 25 and comprise (FIG. 25) a clutch disk 360 having a bore with two opposing flat sides 361a and a pair of rounded studs 362 extending from the flat face 360a of said disk and an input gear 320 having a pair of holes 364 formed in the opposing center portion. When the studs 362 are held within the holes 364 by spring 335, as shown also in FIG. 18, the clutch disk 360 rotates with drive gear 320. Because the flat sides 361a of clutch disk 360 fit around the similarly shaped flat sides 330b of the hub 330 (FIG. 17), when input gear 320 is rotated from an external source and clutch disk is engaged therewith, hub 330 is rotated in the same direction. However, if the counting dials were jammed for some reason, such as if the resetting lever were continually held in the engaged position with bar 346 against the stop 344 (only momentarily in regular operation) thereby preventing the counting dial 340 from rotating further in the counting direction while an input to gear 320 continued, then the overload clutch would disengage. The overload clutch disengages by means of the clutch disk 360 moving axially (to the left in FIG. 18) along the hub and the studs 362 coming out of the holes 364 in gear 320 against spring 335, thereby allowing the drive gear 320 to rotate freely on hub 330. If the clutch disk remained disengaged from input gear 320 for more than a segment of one revolution, this input count would not be totally lost on standard complete apparatus because it would be recorded by a totalizer (not shown) which is not resettable and which continues to record whenever there is an input. The purpose of the clutch described above is to prevent broken gears when the mechanism jams or when it is operated incorrectly.

As shown in sectional view in FIG. 18, the overload clutch 360 is engaged when the disk studs 362 are located in the holes 346 so that rotary motion applied to drive gear 320 rotates the disk 360, the hub 330 and first counting dial 340. As shown in FIG. 19, the overload clutch is disengaged when the studs move out of the holes, the clutch disk 360 being pressed to the left against spring 335 when, in this instance, the resetting anti-overthrow pawl 346 is engaged against anti-overthrow stop 344, thereby preventing further rotation of dial 340. It should be recognized that, under normal operation, resetting is completed and pawl 346 moves from the interfering position with stop 344 leaving dial 340 at the zero position before an input is delivered to gear 320. However, if, for example, the operator would hold the reset lever down preventing the automatic return of pawl 346 while causing an input, such as by dispensing gasoline, then the overload clutch disengages as described to prevent breaking of the gears.

Referring now to FIGS. 20 through 23, the resetting mechanism of the unitary counter wheel assembly 300 includes, in further detail, the separately activated resetting gear 310 mounted on the bearing portion 349 of the count dial 340 (FIGS. 18, 19). As shown best in FIG. 20, the resetting pawl 312 is supported by a long flexible arm 313 which is anchored at the top of the groove 314 in the resetting gear. As shown in FIG. 24, the pawl 312 extends axially to move within shaped groove 348 in dial 340 and presses against the spiral bearing surface 348a as dial 340 rotates. A radially directed surface 350 forms the ratchet against which the pawl 312 engages to rotate and drive the counting dial 340 to the reset or zero position when the reset gear is rotated counterclockwise as seen from the front.

In FIGS. 20 and 22, pawl 312 has sprung outwardly or to the left so as to engage the surface 350 and cause the counting dial 340 to rotate in the clockwise direction as shown in these figures when the resetting gear is rotated. As illustrated in FIGS. 21 and 23, if the resetting gear is not rotated but the dial is rotated by a count fed through the drive clutch in the direction of the arrow, the pawl 312 slips along the curved surface 348a and does not effectively engage the dial.

It should be seen that this form of unitary counter wheel assembly provides a very compact and economic arrangement of a count dial and reset gear, an overload clutch, an input drive clutch, and a reset anti-overthrow stop. When this basic assembly is combined with a series of counting dials and the quick-action reset apparatus shown in FIG. 8, a very efficient resettable counter is produced.

It should be understood that a further unique feature of the counter described herein is the provision that the resetting gears associated with each dial are rotated first in one direction and then in the reverse more than one complete revolution or about 1.2 or 1¼ revolutions in the operating and then return movement on the reset lever. The resetting gears are returned to their initial positions on the return or reverse movement of lever 112 as indicated in FIG. 8. This insures that each counting dial is returned to the zero position no matter what position each dial may be in when resetting begins. If the sector or quadrant gear 107, shown in FIG. 8, were of such size as to rotate the reset gear only one complete revolution, then when the dials are at certain positions they would not all be picked up in order and returned to zero but would still have a count remaining on one. For example, a count of "7" or less on a higher order dial and a count of "8" or "9" on the next lower order dial would reset to "0" on the higher order dial and "1" on the lower order dial. This ocurs because in such a situation the higher order dial is picked up by its reset gear before the lower order dial is picked up, and as the teeth of the dials are meshed the higher order dial drives the other dial forward so that it moves beyond zero and displays a count of "1." The reset gear of the lower order dial then completes its revolution without ever engaging its dial and the dial remains at this position displaying a count of "1" while the remaining dials show "0." If, however, the reset gears 310 rotate slightly more than 1.2 revolutions, those dials which are rotated ahead by their adjacent dials will in all cases be picked up and returned to the zero position. In such a case, the lower order dial would also rotate more than one complete revolution. Movement of the anti-overthrow pawl 346 is so timed during the reset operation that said pawl moves into interfering position relative to counting dial stop 344 only after reset gear 310 has been moved more than one-quarter revolution from its beginning position, so that pawl 346 will not engage stop 344 if the counting dial is picked up by the resetting gear immediately or within the first one-quarter revolution of the resetting gear.

As it is desirable to provide as many counting digits or count indicating numerals in the face in the counter as possible, this invention also teaches how a multiple digit indicator can be mounted and operated on a single pintle as part of the counter assembly. By means of the mechanism shown in FIGS. 26–30, a pair of counting dials can operate in an area only slightly larger than that occupied by a single counting dial and its associate mechanism.

Figure 26:
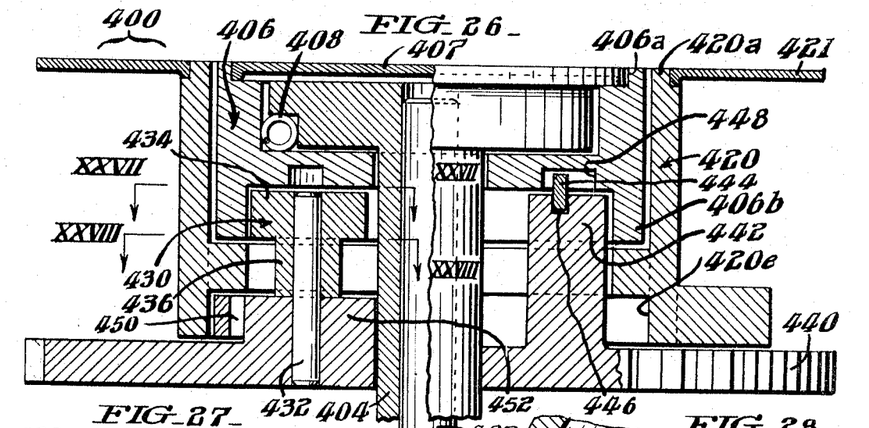
FIG. 26 is a sectional view, partly in elevation, of a multiple indicator mounted on a single pintle.

A preferred form of a multiple indicator for a single pintle is shown in FIG. 26 and generally designated by the numeral 400. The indicator 400 is constructed similar to the unitary wheel assembly illustrated in FIGS. 15–25 and for brevity, the drive gear 320, the drive dog 360 and the parts comprising the overload clutch of said mechanism are not shown in connection with the indicator 400. However, it should be understood that the drive mechanism and overload clutch, one form of which is indicated in FIGS. 18 and 25, can readily be assembled with the multiple indicator 400 shown in FIGS. 26 through 30.

The indicator 400, illustrated in FIG. 26, comprises a hub 404 mounted on a pintle 402 which in turn is mounted within the supporting portion of the counter assembly (not shown). The hub 404, constructed similarly to the hub 330 shown in FIGS. 15–25, drives a first or fractional counting dial 406 by means of a drive clutch 408. A circular dial face or disc 407 having numerals marked thereon is centrally located within the cylindrical walls 406a of the counting dial 406.

A second or units counting dial 420 having cylindrical walls 420a substantially surrounds the first counting dial 406 and supports an annular number disc 421 by the walls 420a. The fractional counting dial 406 is connected to and drives the units counting dial 420 in such a way, as explained in detail infra, that the second counting dial 420 rotates one complete revolution for every ten revolutions of the dial 406. For example, if the first dial 406 has numerals on the face disc 407 indicating fractions of one gallon, i.e., a complete revolution indicating the pumping of one whole gallon, the face plate 421 has numerals each of which indicate one gallon so that a complete revolution of the dial 420 indicates the pumping of ten gallons.

A transfer pinion 430, mounted on a transfer pintle 432 which in turn is mounted within the resetting gear 440, serves to transfer the count or rotary movement from the first dial 406 to the second dial 420. The resetting gear 440 is otherwise equipped with two resetting pawl holders 452, 442 and their respective pawls 450, 444.

Figure 27:
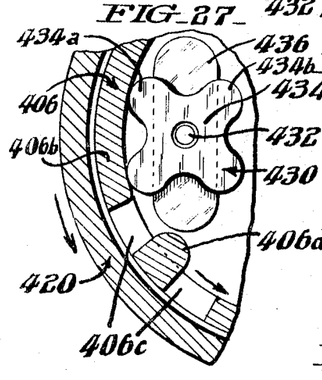
FIG. 27 is a partial sectional view, partly in plan, of the transfer pinion taken along the lines and arrows XXVII—XXVII of FIG. 26.
Figures 28, 29:
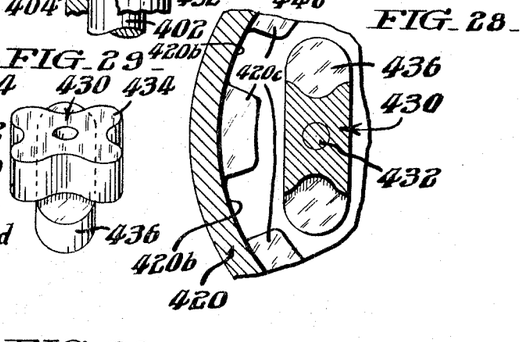
FIG. 28 is a partial sectional view of the transfer pinion taken along the lines and arrows XXVIII—XXVIII of FIG. 26.
FIG. 29 is a perspective view of the transfer pinion illustrated in the mechanism of FIG. 26.

The transfer pinion 430, as shown in FIGS. 27–29, consists of a four-lobe impeller 434 fixedly mounted on a two-lobe impeller 436, said transfer pinion 430 being free to rotate on pintle 432. As illustrated in FIG. 27, the inner cylindrical wall 406b of the primary or fractional counting dial 406 is interrupted at two points 406c and separated by an extending tooth 406d. The four-lobe impeller 434 is so constructed that, upon rotation of the counting dial 406 in the direction of the arrow, the impeller 434 would not rotate until almost a complete revolution of dial 406 was completed. As the enlarged tooth 406d came into contact with lobe 434a, as illustrated in FIG. 27, said lobe would fall into the first space 406c and the second lobe 434b would fall into the second space 406c. This would cause the four-lobe impeller 434 to rotate two lobes or 180 degrees. As a result of such movement, the two-lobe impeller 436, as illustrated in FIG. 26, would rotate into the space 420b between the teeth 420c positioned around the inner wall of dial 420. Movement of the impeller 436 derived from dial 406 causes the units dial 420 to advance one unit. In summary, this construction causes a count delivered to the fractional dial 406 to advance the fractional dial one complete revolution as the units dial 427 rotates 1/10 of a revolution.

Figure 30:
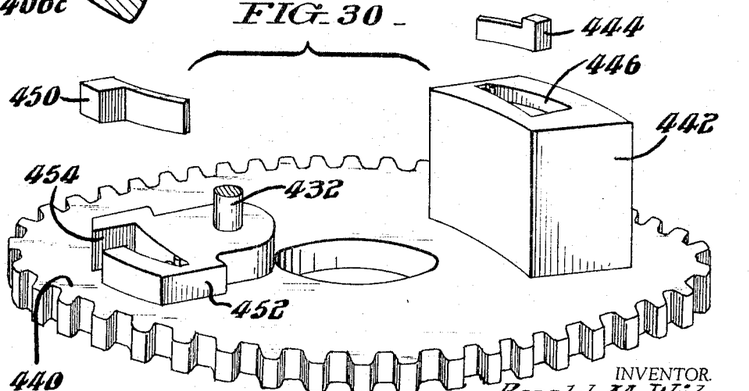
FIG. 30 is a perspective view of the reset gear and attachments as also shown in sectional view in FIG. 26.

A preferred form of the resetting apparatus of the multiple indicator is illustrated in FIG. 30 and comprises a reset gear 440 having a units reset pawl 450 mounted in a pawl holder 452. A shaped groove 454 is provided in the pawl holder 452 allowing pawl 450 to spring outwardly to engage a ratchet (not shown) mounted on the inner surface of cylindrical wall 420e of the unit dial 420 as illustrated in FIG. 26.

Similarly, a reset pawl 444 is mounted in a pawl holder 442 having a shaped groove 446, said pawl positioned to engage a ratchet (not shown) mounted within the annular space 448 of the fraction dial 406. As described in connection with the apparatus shown in FIGS. 15 through 25, as the reset gear 440 rotates in the resetting direction, the fractional dial pawl 444 picks up the ratchet of the fractional dial 406 and the unit dial pawl 450 picks up the ratchet of the unit dial 420 causing both dials to rotate in advance of hub 404 and back to the zero position. As described supra, said forward resetting motion is allowed by the clutch 408.

By means of the construction shown herein, two counting dials and their respective face discs can be mounted and operate in substantially the space required for one. This allows a four-digit counter to have the numerals positioned in a single line across the face of the counter or pump assembly even though the dials and assembly are arranged in roughly a triangular shape as shown in FIG. 8. The construction shown and described herein provides a compact and efficient mechanism for counters and pumps as described otherwise in connection with this invention.

Although this invention has been described with the reference to specific forms and embodiments thereof, it will be apparent to those skilled in the art that various changes other than those referred to above may be made in the form of the apparatus, that equivalent elements may be substituted for those illustrated in the drawings, that parts may be reversed, and that certain features of the invention may be used to advantage independently of the use of other features, or within the spirit and scope of the invention as defined in the appended claims.

Having thus described my invention, I claim as follows:

1. A resettable counter for mounting on a single shaft comprising
   a hub having an axial bore for mounting on a shaft and an annular flange located at one end of the hub,
   a counting dial mounted on the hub adjacent the flange and having an annular portion extending axially around the periphery of the hub flange,
   a unidirectional drive means connecting the hub and the dial to cause the dial to rotate with the hub when the hub rotates in the counting direction but to allow the dial to rotate freely from the hub when the dial is driven independently in the same direction,
   an input gear mounted on the hub for independent rotation thereon, said gear being driven by a source of rotary movement, and
   severable connecting means joining the input gear to the hub for rotating the hub and dial in the counting direction while the dial remains able to rotate in that direction but said means being capable of disconnecting the input gear from the hub when the dial is not free to rotate.

2. The resettable counter as defined in claim 1 further including
   an arcuate, tapered slot formed in the periphery of the hub flange with the dial annular portion forming the outside of said slot, a ball mounted in the slot being spring biased toward the tapered end of the slot to a location where the ball frictionally engages both the hub flange and the dial annular portion whereby when the hub flange is rotated in a direction similar to that from the restricted toward the enlarged end of the slot the ball becomes frictionally engaged and causes the dial to rotate with the hub.

3. The counter as defined in claim 2 wherein the severable connecting means comprises
   a clutch disk fixedly mounted on the hub for rotation therewith, said disk having at least one stud protruding axially therefrom, at least one hole opposingly formed in the input gear in an axial direction of a size similar to that of the stud, and spring means for continually urging the clutch disk axially toward the input gear so that the stud fits within the hole causing the gear, disk and hub to rotate together whereby when the hub cannot rotate freely, the disk moves axially against the spring thereby disengaging the stud from the gear hole and allowing the input gear to rotate independently.

4. The counter as defined in claim 3 further including a dial reset gear mounted on the hub adjacent the dial and engaged to a source of rotary movement active at selected times, said reset gear having a pawl extending axially therefrom to engage a ratchet formed in the dial when the reset gear is rotated in the counting direction to advance the dial to the zero position, said pawl not engaging the dial ratchet when the dial is rotated by the hub in the counting direction.

5. The counter as defined in claim 4 further including a radially extending tooth mounted on the dial and a pawl mounted independently of the hub being positioned to move into contact with the dial when the reset gear is activated, said tooth being so located on the dial in relation to the zero position of the dial that when the dial is rotated by the reset gear the pawl engages the tooth to stop the dial at the zero position.

6. The counter as defined in claim 5 further including an advancing pawl mounted on the periphery of the dial to engage peripheral teeth of an adjacent independently mounted second counting dial whereby one complete revolution of the first dial causes the second dial to advance only a portion of one revolution.

7. A resettable counter for a liquid-dispensing pump, said counter comprising a plurality of counting dials mounted on individual shafts, means connecting the dials so that upon the rotation of one dial the adjacent dial will rotate, a resetting gear mounted on each shaft and positioned to engage the adjacent resetting gear, means connecting the resetting gear and counting dial on each shaft whereby upon rotation of the resetting gear the counting dial will reset to the zero position, means for resetting the counting dials in conjunction with operation of the pump motor comprising means for operatively engaging one resetting gear and means for operating the resetting gear means with the pump starting mechanism whereby the counting dials can only be reset while the pump motor is off.

8. In a resettable counter, a multiple count indicator mounted on a single pintle comprising a hub mounted on the pintle for independent rotation, a first counting dial mounted on the hub, a unidirectional drive clutch positioned between the hub and the first counting dial, said clutch providing means for rotating the counting dial with the hub while the latter rotates and allowing the said dial to rotate in advance of the hub when said dial is separately driven, a second dial mounted concentric with the first dial, motion transfer means connecting the two dials whereby the second dial is rotated only a portion of one revolution for each complete revolution of the first counting dial, a resetting gear mounted on the hub and means attached to said resetting gear for engaging both counting dials and returning them to the zero position as the resetting gear is rotated in the resetting direction.

9. The counter as defined in claim 8 wherein the transferring pinion comprises a four-lobe impeller and a two-lobe impeller, said four-lobe impeller engaging the inner cylindrical surface of the first counting dial and the two-lobe impeller engaging the inner cylindrical surface of the second counting dial, said four-lobe impeller rotating 180 degrees for each complete revolution of the first dial thereby rotating the second dial a portion of one revolution.

10. The counter as defined in claim 8 wherein each counting dial is equipped with a number disc, the number disc of the second dial being concentric to that of the first counting dial and annular in shape.

11. A resettable counter comprising, in combination; a plurality of substantially parallel shafts; a counting dial mounted for rotation on each shaft in such axial positions that peripheral portions of a lower order dial are adjacent peripheral portions of a higher order dial; carry means associated with a lower order dial and rotating therewith for contacting and rotating the next higher order dial a fraction of one revolution for each revolution of said lower order dial; a count input shaft; a unidirectional clutch coupling said input shaft to the lowest order counting dial for rotating said lowest order dial in one direction in response to rotation of said input shaft, said unidirectional clutch allowing said lowest order dial to be rotated in said same one direction independently of rotation of said input shaft; and reset means for returning each of said counting dials to its zero position, said reset means including: a train of meshed reset gears, one on each of said parallel shafts; means coupling together the reset gear and its associated counting dial for driving said counting dials rotationally in said same one direction in response to rotation of said reset gears; lever means for driving said reset gears rotationally; and limit stop means for preventing further rotation of said reset gears after one of said reset gears has been rotated a fraction of a revolution in excess of one complete revolution.

12. Apparatus according to claim 11 characterized in that said limit stop means includes means actuable by said lever means.

13. Apparatus according to claim 11 characterized in that said limit stop means includes a single tooth ratchet wheel secured to a face of said one reset gear, and a pawl actuable by said lever means and movable into wiping contact on the periphery of said ratchet wheel after said ratchet wheel has rotated a fraction of one revolution sufficient to allow the single tooth of said ratchet wheel to pass by the wiping contact position of said pawl.

14. Apparatus according to claim 11 characterized in that said means coupling together the reset gear and its associated counting dial for driving said counting dials rotationally in said same one direction in response to rotation of said reset gears includes a single tooth ratchet and a pawl, one moved rotationally by the reset gear and the other moved rotationally by the counting dial, and so disposed relative to each other that when said counting dials are moved rotationally by said input shaft said pawl and ratchet move relative to each other, but when said reset gears are driven, the ratchet and pawl become interlocked and move together.

15. Apparatus according to claim 13 characterized in that said means coupling together the reset gear and its associated counting dial for driving said counting dials rotationally in said same one direction in response to rotation of said reset gears includes a single tooth ratchet and a pawl, one moved rotationally by the reset gear and the other moved rotationally by the counting dial, and so disposed relative to each other that when said counting dials are moved rotationally by said input shaft said pawl and ratchet move relative to each other, but when said reset gears are driven, the ratchet and pawl become interlocked and move together.

16. Apparatus according to claim 15 further characterized in that said lever means includes a pinion fixed to the shaft on which one of said reset gears is mounted, a gear sector in mesh with said pinion, a lever arm for moving said gear sector, said gear sector having a larger number of teeth than said pinion whereby said reset gears are rotatable through more than one complete revolution.

17. Apparatus according to claim 16 wherein said gear sector has less than twice as many teeth as said pinion whereby said reset gears are rotatable through a fraction of a revolution in excess of one complete revolution.

18. Apparatus according to claim 17 further characterized in that the single tooth ratchet and pawl which couple together each reset gear and its associated counting dial are so disposed relative to each other that if said counting dial is already at zero at the start of the reset operation, said single tooth ratchet and pawl do not become interlocked and do not move together until after the reset gear has moved rotationally through said fraction of a revolution.

19. Apparatus according to claim 18 wherein the single tooth ratchet wheel of said limit stop means is so secured to the face of said one reset gear that said reset gear and ratchet wheel are moved through approximately one-quarter of a revolution before said pawl makes wiping contact with said ratchet wheel.

References Cited by the Examiner
UNITED STATES PATENTS

| | | | |
|---|---|---|---|
| 542,042 | 7/1895 | Charter | 192—45 |
| 1,054,363 | 2/1913 | Newell et al. | 235—113 |
| 2,040,026 | 5/1936 | Spaunberg | 235—132.1 |
| 2,159,314 | 5/1939 | Bliss | 235—132 |

RICHARD B. WILKINSON, *Primary Examiner.*